United States Patent
Causey et al.

(10) Patent No.: US 7,957,765 B1
(45) Date of Patent: Jun. 7, 2011

(54) MOBILE PHONE WITH INTEGRATED WIRELESS CAMERA

(75) Inventors: Mark Edward Causey, Tucker, GA (US); Scott Andrus, Prior Lake, MN (US); Adrianne B. Luu, Roswell, GA (US); Kevin W. Jones, St. Louis Park, MN (US)

(73) Assignee: AT&T Mobility II LLC, Atlanta, GA (US)

( * ) Notice: Subject to any disclaimer, the term of this patent is extended or adjusted under 35 U.S.C. 154(b) by 489 days.

(21) Appl. No.: 11/754,058

(22) Filed: May 25, 2007

(51) Int. Cl.
*H04M 1/00* (2006.01)
(52) U.S. Cl. .................. 455/556.1; 455/550.1; 455/557
(58) Field of Classification Search ............... 455/556.1, 455/550.1, 557
See application file for complete search history.

(56) References Cited

U.S. PATENT DOCUMENTS

| | | | |
|---|---|---|---|
| 6,115,616 A | 9/2000 | Halperin et al. | |
| 7,463,304 B2 * | 12/2008 | Murray | 348/371 |
| 2002/0013161 A1 * | 1/2002 | Schaeffer et al. | 455/557 |
| 2003/0157960 A1 * | 8/2003 | Kennedy | 455/556 |
| 2007/0010289 A1 | 1/2007 | Mezue | |

* cited by examiner

*Primary Examiner* — Edward Urban
*Assistant Examiner* — Fayyaz Alam
(74) *Attorney, Agent, or Firm* — Moazzam & Associates, LLC

(57) ABSTRACT

A wireless mobile telecommunications device includes a detachable camera that wirelessly communicates data with the device body. The device is usable not only to make and receive telephone calls in the conventional manner but also to take photographs or video. When the camera portion is detached from the device body, the camera can be used in essentially the same manner as any digital photography or video camera. Images captured by the camera are wirelessly transmitted to the device body.

16 Claims, 3 Drawing Sheets

MOBILE PHONE WITH INTEGRATED WIRELESS CAMERA

BACKGROUND OF THE INVENTION

1. Field of the Invention

The present invention relates to "camera phones" or mobile telephones having integrated cameras.

2. Description of the Related Art

A mobile telephone, also commonly referred to as mobile phone, cellular telephone, cell phone, wireless phone, mobile station, mobile/wireless user equipment, etc., that has an integrated or built-in camera is commonly referred to as a "camera phone." The camera typically comprises a small CMOS-based or CCD-based image sensor and associated control electronics. The user can take still and video images in a manner similar to that in which a person uses any ordinary digital camera. That is, the user aims the camera phone image sensor at a subject and presses one of the buttons on the phone, causing the phone to capture the image of the subject in the form of a digital image file (e.g., in JPEG format) in memory. The phone's programming includes functions that not only allow the user to capture images but also to organize and transmit the images through the same wireless telecommunications network through which the user can communicate voice, i.e., telephone calls, using the phone. The network typically includes a server on which the images can be stored, and the network service provider offers users services in connection with the use of the server to save images, upload them to computers via the Internet, and share them with others. The user can transmit the images to other persons having phones or similar devices that are capable of receiving images. Some newer camera phones even allow users to conduct videoconference-like phone calls between them. Nevertheless, a user cannot easily move between the aspects of the user interface that control the telephone features and the aspects of the user interface that control the camera features; rather, a user must generally interrupt the telephone call to adjust the camera, and vice versa.

In some respects, however, camera phones are not as convenient to use as stand-alone handheld digital cameras and videoconferencing cameras. For example, camera phones are generally designed to be easy and comfortable for a user to hold while conducting telephone calls, with little thought given to ease and comfort while taking pictures.

Camera phones have also been used by unscrupulous individuals to discreetly take pictures in museums, performance halls, secure facilities, and other places where photography is prohibited. For this reason, many such places have banned camera phones. Security personnel at the entrance may request that visitors leave their camera phones at the entrance to retrieve when they leave. Having to leave phones behind prevents visitors from legitimately making and receiving phone calls during their visit, causing them some concern over that as well as the possibility that their phones will be stolen or forgotten.

It would be desirable to provide a camera phone that is as convenient to use as a camera as it is to use as a phone. It would also be desirable to provide a camera phone that alleviates concerns at places where photography is prohibited. The present invention provides a camera phone and method of use that addresses the above-described problems and deficiencies in the manner described below.

SUMMARY OF THE INVENTION

The present invention relates to a wireless mobile telecommunications device, such as a cell phone or similar device, and method for using it to not only make and receive telephone calls in the conventional manner but also to take photographs or video by detaching a separable camera from the body of the device and then taking the still or video images after the camera has been detached. In the detached state, the camera can be used in essentially the same manner as any digital photography or video camera. The user can point the camera at a subject and press a button to cause the device to take a picture.

The body and camera communicate data with each other via a wireless personal area network (WPAN), such as that which conforms to the well-known BLUETOOTH specification. Thus, even when the camera is not attached to the body, the camera can transmit digital signals representing an image to the body via the WPAN. When the camera is attached to the body, the camera can transmit such digital signals via an electrical connector or, alternatively, via the WPAN or other suitable means.

DETAILED DESCRIPTION

Figure 1:
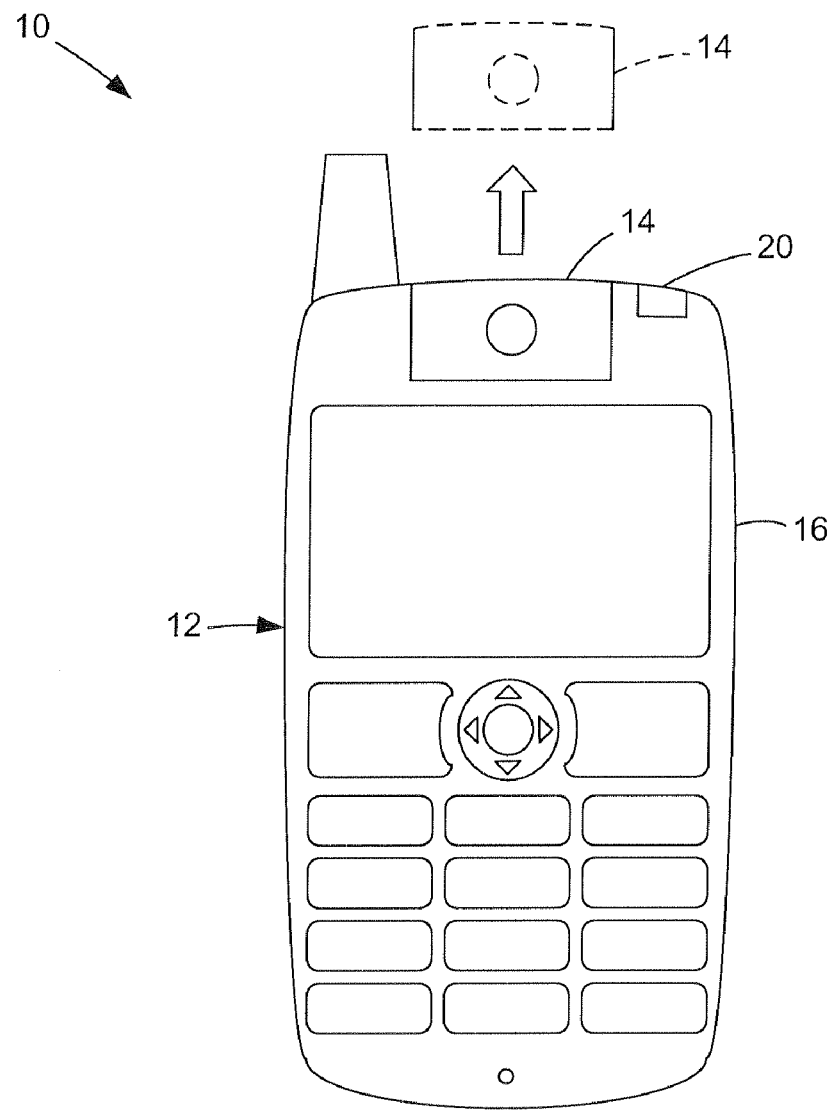
FIG. 1 is a front elevation view of a wireless mobile telecommunication device in accordance with an exemplary embodiment of the invention.

In the following description, like reference numerals indicate like components to enhance the understanding of the invention through the description of the drawings. Also, although specific features, configurations, arrangements and steps are discussed below, it should be understood that such specificity is for illustrative purposes only. A person skilled in the relevant art will recognize that other features, configurations, arrangements and steps are useful without departing from the spirit and scope of the invention. Unless specifically noted otherwise, the order in which method steps are described is for illustrative purposes only, and such steps can be arranged in any other suitable order or combined with each other or divided apart in any suitable manner.

Figure 2:
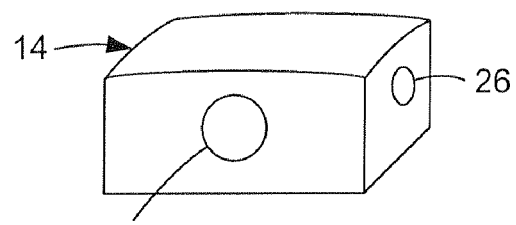
FIG. 2 is a perspective view of the camera, detached from the body of the device of FIG. 1.

As illustrated in FIGS. 1-2, in an exemplary embodiment of the invention, a mobile phone 10 (also known as a cell phone, mobile station, user equipment, etc.) has a body 12 and a detachable camera 14 that a user can remove or separate from body 12. With respect to telecommunications functions, body 12 functions in essentially the same manner as typical conventional mobile phones, allowing the user to make and receive phone calls via a conventional wireless telecommunications network (not shown), such as a cellular network. Accordingly, mobile phone 10 includes conventional elements that enable such functions, such as a user interface (e.g., keypad, display, directional buttons, speaker, microphone, etc.) and digital and analog communications circuitry, as described in further detail below. Although the configuration of mobile phone 10 as shown in FIG. 1 is typical for such a device and thus used for purposes of illustration, in other embodiments of the invention the cell phone or other wireless mobile telecommunications device can have any other suitable configuration and shape known in the art, such as a clamshell structure, QWERTY keyboard, fully internal antenna, etc., and can include any suitable additional communications, computing, or entertainment functions of the types known to be includable in such handheld telecommunications devices.

Figure 3:
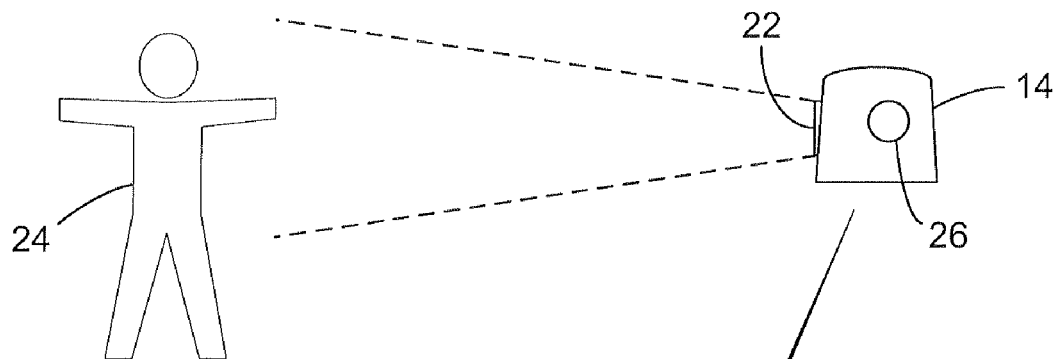
FIG. 3 is similar to FIG. 1, showing the camera in wireless communication with the body of the exemplary device while capturing an image.
Figure 3:
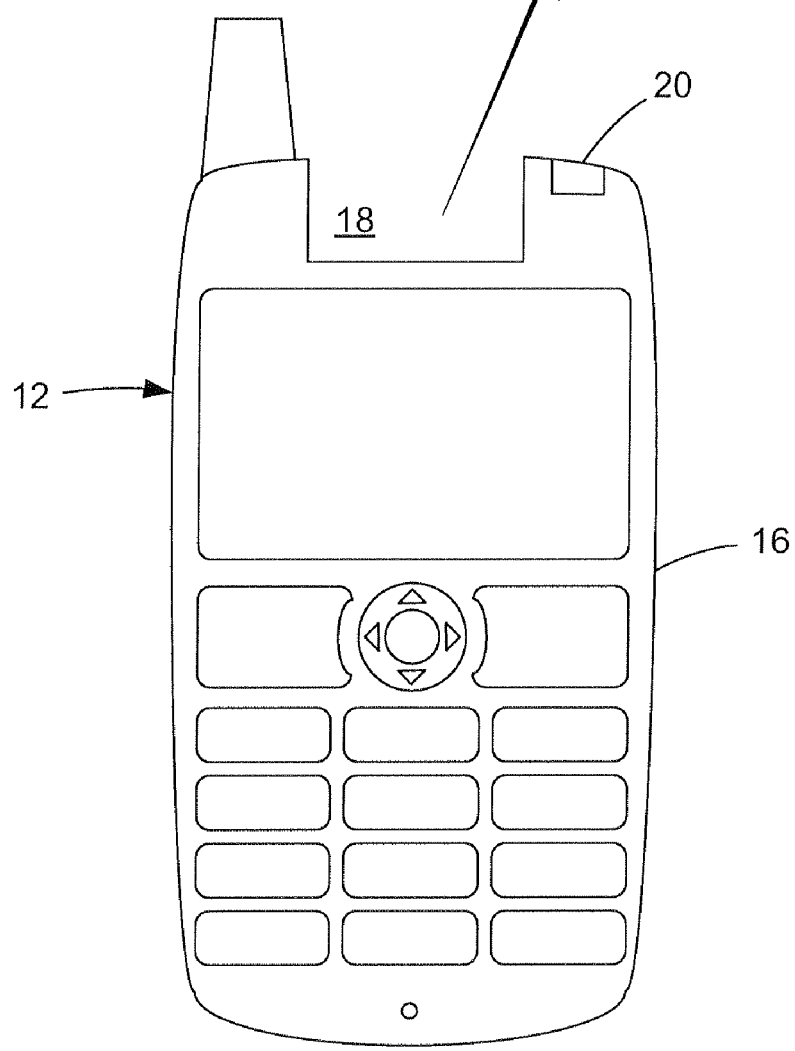

Body 12 includes a housing 16, from which camera 14 is detachable. In the exemplary embodiment, camera 14 is retained within a correspondingly shaped recess 18 in housing 16, as best illustrated in FIG. 3. Camera 14 is attached to housing 16 in a manner that secures it against inadvertent removal yet allows a user to quickly and easily remove or detach it from body 12. For example, a release mechanism can be included that has a button 20 that a user depresses to unlatch camera 14 from body 12. Alternatively, camera 14 can be retained by a snap engagement, such that a user can remove camera 14 from body 12 by gripping it and pulling it away from body 12 with sufficient force to overcome a resilient force exerted by portions of the snap engagement. In other embodiments, any other suitable means for removably securing or retaining camera 14 can be included in body 12, camera 14 or both, and all such means will occur readily to persons skilled in the art in view of the teachings herein.

It should also be noted that the position on body 12 at which camera 14 is shown to be attached is intended only to be exemplary, and in other embodiments the camera can be attached at any other suitable position on body 12 and integrated with body 12 in any other suitable manner. For example, although camera 14 is shown as occupying a recess 18 that extends through the top edge of housing 16, in other embodiments camera 14 can be retained on the back or reverse side (not shown) of housing 16, or in any other suitable location. In such embodiments, camera 14 can fit flush with housing 16 so as to provide a highly integrated and smooth appearance. Alternatively, it can fit against and protrude from housing 16.

Camera 14 can have any suitable shape and configuration. The boxy shape shown in FIGS. 1-3 is intended only to be illustrative. For example, in other embodiments of the invention, the camera can have a more ergonomic or otherwise easier-to-handle shape and can include features that a user can grip to hold it steady, similar to features of a conventional digital photographic camera. In other embodiments, the camera can also include an electronic display-based or optical viewfinder through which a user can look to help aim the camera at a subject to be photographed.

As illustrated in FIG. 3, after a user has separated or detached camera 14 from body 12, the user can use camera 14 to capture still or video images in essentially the same manner as a conventional digital photographic camera. That is, a user can aim the image sensor 22 of camera 14 at a subject 24 and provide an indication to capture an image. In the exemplary embodiment, camera 14 includes a pushbutton switch 26 that a user can depress to provide the indication. Alternatively, or in addition, body 12 can wirelessly transmit the indication to camera 14 via a BLUETOOTH wireless personal area network (WPAN).

BLUETOOTH is a well-known specification for a wireless (i.e., radio-based) digital network that provides data communication among digital devices having suitable transceivers over a relatively short range on the order of several meters. In the context of mobile phone technology, a BLUETOOTH network is commonly used for communicating digital audio data between a mobile phone and a wireless earpiece that a user can wear while making and receiving phone calls. At the time of this writing, the IEEE 802.15 Working Group for WPAN is expected to adopt BLUETOOTH or a substantially similar specification as the IEEE 802.15 standard. Although in the exemplary embodiment of the invention the WPAN conforms to the BLUETOOTH specification, in other embodiments the WPAN can conform to any other suitable specification for wireless data communication. Also, the terms "wireless personal area network" and "WPAN" are used herein only for purposes of convenience to refer to wireless data communication between two nearby devices, and not to imply the existence of any specific networking protocols or other networking functionality.

Images that the user causes camera 14 to capture are transmitted from camera 14 to body 12 via the WPAN, either as soon as they are captured or, alternatively, at a later time (by retrieving them from a suitable memory internal to camera 14). Camera 14 can automatically transfer the images in this manner or, alternatively, in response to a command or indication from the user. Note that some or all of the user interface through which a user operates camera 14 can be included in body 12 rather than camera 14. For example, the user can enter settings and configurations for the camera using the user interface on body 12, and the information can be transmitted from body 12 to camera 14 via the WPAN. In this manner, camera 14 can have a minimal number of user-operable elements. In the exemplary embodiment, for purposes of illustration, the user interface through which a user operates camera 14 comprises pushbutton switch 26 on camera 14.

Thus, in accordance with a method for using mobile phone 10, a user can not only make and receive telephone calls in the conventional manner but can also remove or detach camera 14 and cause it to capture images. For example, the user can press pushbutton switch 26. In response, camera 14 captures an image and transmits signals representing the image to body 12. As noted above, the image can be transmitted as it is being captured or at a later time. When the user is finished taking pictures, the user can replace camera 14 by performing the reverse of the procedure for detaching it from body 12. Once the images have been transferred to body 12, they can be handled in any suitable manner, such as that in which conventional camera phones handle captured images. For example, a user can cause mobile phone 10 to transmit a selected image to another party via the wireless telecommunications network, use a selected image as a screensaver or ring alert, upload the image to a server via the wireless telecommunications network, etc. As such operations are well understood in the art, they are not described in further detail herein.

The detachability feature enhances user convenience by freeing the user from having to maneuver the entire mobile phone while taking pictures. The user can leave body 12 in a convenient nearby location, such as on a table, in the user's shirt pocket, or clipped to the user's belt, while the user takes pictures with camera 14. In some embodiments, camera 14 can have a shape or an adjustable base or similar features (not shown) that facilitate aiming camera 14 while placed on a table or desk for convenient videoconferencing.

With camera 14 detached from body 12, the user can easily operate both the camera user interface and the device (body) user interface. If the user is engaged in a telephone call, the user need not divert attention from the call to adjust camera 14 or interrupt use of camera 14 to answer or make a telephone call.

The detachability feature also allows a user to remove and leave camera 14 behind when entering a place where photography is prohibited, thereby allowing the user to continue to make and receive phone calls. Body 12 can include a reminder feature such as a timer that, some predetermined amount of time after body 12 has been out of BLUETOOTH communication range with camera 14, causes body 12 to emit an audible tone as a reminder to recover camera 14.

Figure 4:
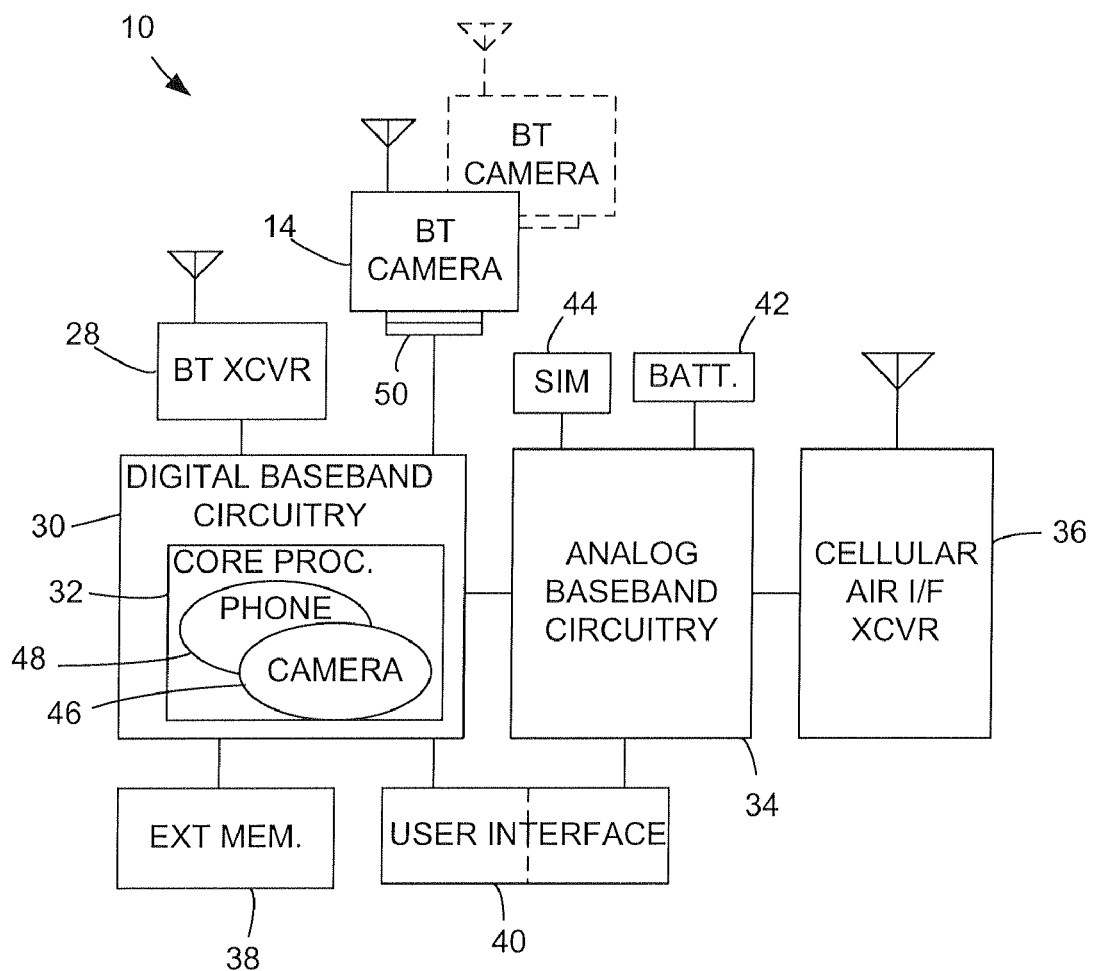
FIG. 4 is a block diagram of the exemplary device of FIGS. 1-3.

As illustrated in FIG. 4, mobile phone 10 includes a BLUETOOTH (BT) transceiver 28 that can communicate with a corresponding transceiver (not separately shown) in camera 14 in accordance with the BLUETOOTH specification. Mobile phone 10 also includes digital baseband circuitry 30 having core processing logic 32 that is programmed or configured to enable the exemplary methods of using camera 14 described herein in addition to conventional methods relating to the making and receiving of phone calls and other conventional operations of the types commonly performed in mobile phones. In addition to digital baseband circuitry 30 that performs essentially all of the digital operations needed to operate mobile phone 10, mobile phone 10 includes analog baseband circuitry 34 that performs essentially all of the analog operations, and radio frequency (RF) transceiver circuitry 36 that defines the phone side of the air interface with the cellular telecommunications network. Digital baseband circuitry 30 is coupled to external memory 38 and digital portions of the user interface 40, such the display screen, keypad, and other such digital user interface elements commonly included in conventional mobile phones and similar devices. Analog baseband circuitry 34 is coupled to the battery 42, SIM card 44, and analog portions of user interface 40, such as the microphone, speaker, vibrator (buzzer), LED indicator lamp, and other such analog user interface elements. Mobile phone 10 can include additional elements of the types commonly included in conventional mobile phones and similar devices, but such elements are not shown for purposes of clarity. Note that the above-described architecture of mobile phone 10 is intended only to be exemplary, and persons skilled in the art will readily be capable of embodying this aspect of the invention in any other suitable type of wireless mobile telecommunications device.

In the exemplary embodiment, the aspects of mobile phone 10 that relate most directly to the present invention are camera 14, BLUETOOTH transceiver 28 and the programmed or configured core processing logic 32. Processing logic 32 can comprise, for example, a programmed processor or controller or other hardware, software, firmware or combination thereof. In addition to processing logic 32, digital baseband circuitry 30 includes internal memory (not separately shown), digital signal processing circuitry (not separately shown) that performs encoding and decoding and other functions, and other elements of the types commonly included in the digital portions of a mobile phone.

Processing logic 32 is programmed or configured with camera control logic 46 to control communication of signals representing the images captured by camera 14 and perform other functions relating to camera 14. That is, when a user causes camera 14 to capture an image, processing logic 32 controls BLUETOOTH transceiver 28 to ensure that the image is received and stored in memory 38. Processing logic 32 also enables the user to manipulate the received images, such as by organizing them and causing them to be transmitted via the wireless telecommunications network to a selected recipient in the form of a multimedia message, e-mail attachment or other suitable form as known in the art. Processing logic 32 can also be programmed or configured to control other aspects of camera 14, such as transmitting an indication to camera 14 to capture an image or selecting and transmitting configuration settings to camera 14.

Processing logic 32 is also programmed or configured with phone control logic 48 to control the making and receiving of telephone calls in the conventional manner. Processing logic 32 can be programmed or configured with still other logic of the type known in the art to be common in mobile phones and similar devices, such as logic for sending and receiving messages, logic for organizing and using an address directory, and application programs such as games and calendar functions, but for purposes of clarity the only logic shown in FIG. 4 are phone control logic 48 and camera control logic 46.

In the exemplary embodiment of the invention, mobile phone 10 also includes an electrical connector 50 having a connector portion (not separately shown) on body 12 and a mating connector portion (not separately shown) on camera 14. While camera 14 remains attached to body 12, any data communications between them occur through electrical connector 50. For example, a user can choose to take pictures while camera 14 remains attached to body 12 rather than detaching camera 14 and using it apart from body 12. Also, signals representing some or all of the captured images can be transferred from camera 14 to body 12 after camera 14 has been re-attached rather than while it remains detached. Furthermore, camera 14 can receive electrical power to recharge a battery (not separately shown) while it remains attached to body 12, so that the user does not need to separately charge camera 14 apart from body 12.

Processing logic 32 can also use electrical connector 50 to sense when camera 14 is detached from body 12. When it senses that camera 14 is attached to body 12, it can cause communication between body 12 and camera 14 to occur through electrical connector 50. When it senses that camera 14 is detached from body 12, it can cause communication between body 12 and camera 14 to occur through the (BLUETOOTH) WPAN. Nevertheless, in other embodiments of the invention, electrical connections between the body and the camera can be minimized, and data communication can occur through the WPAN in all or most instances.

It will be apparent to those skilled in the art that various modifications and variations can be made to this invention without departing from the spirit or scope of the invention. Thus, it is intended that the present invention covers the modifications and variations of this invention provided that they come within the scope of any claims and their equivalents. With regard to the claims, no claim is intended to invoke the sixth paragraph of 35 U.S.C. Section 112 unless it includes the term "means for" followed by a participle.

What is claimed is:

1. A wireless mobile telecommunications device, comprising:
 a device body;
 a device user interface;
 a device electrical connector;
 a camera detachable from the device body, the camera including a first wireless personal area network (WPAN) transceiver, and a battery in electrical communication with a camera electrical connector;
 a second WPAN transceiver in the device body for wirelessly communicating digital signals with the first WPAN transceiver in the camera;
 transceiver circuitry for communicating air interface signals with a wireless mobile telecommunications network;
 digital control circuitry coupled to the user interface and analog transceiver circuitry, the digital control circuitry comprising processing logic programmed or configured to:
  control telephone calls with the wireless mobile telecommunications network; and
  control WPAN communication of digital signals representing images with the camera,
 wherein settings and configurations for the camera may be entered on the device body and transmitted from the device body to the camera through the first WPAN transceiver and the second WPAN transceiver,
wherein the battery is charged from the device electrical connector through the camera electrical connector.

2. The wireless mobile telecommunications device claimed in claim 1, wherein the WPAN substantially conforms to the BLUETOOTH specification.

3. The wireless mobile telecommunications device claimed in claim 1, wherein the camera includes a camera user interface for receiving from a user an indication to capture an image.

4. The wireless mobile telecommunications device claimed in claim 1, wherein at least one of the device body and the camera includes a release mechanism operable by a user for detachably securing the camera to the device body.

5. The wireless mobile telecommunications device claimed in claim 1, further comprising electrical contacts for communicating digital signals representing images with the camera while the camera is attached to the device body.

6. The wireless mobile telecommunications device claimed in claim 5, wherein:
the processing logic is further programmed or configured to sense whether the camera is attached to the device body; and
if the processing logic senses that the camera is attached to the device body, then enabling communication of digital signals representing images with the camera via the electrical contacts;
if the processing logic senses that the camera is not attached to the device body, then enabling communication of digital signals representing images with the camera via WPAN.

7. A method for capturing images using a wireless mobile telecommunications device through which telephone calls can be conducted with a wireless mobile telecommunications network, the method comprising:
detaching a camera from a body of the wireless mobile telecommunications device;
indicating to the camera to capture an image while the camera is not attached to the body;
transmitting digital signals representing an image from the camera to the body via a wireless personal area network (WPAN);
entering settings and configurations for the camera on the body of the wireless mobile telecommunications device;
transmitting from the body of the wireless mobile telecommunications device to the camera through the WPAN;
attaching the camera to the body of the wireless mobile telecommunications device; and
charging a battery of the camera through a device electrical connector, the device electrical connector coupled to the wireless mobile telecommunications device, in electrical communication with a camera electrical connector, the camera electrical connector coupled to the camera.

8. The method claimed in claim 7, wherein the step of detaching the camera from the device body comprises a user operating a release mechanism that detachably secures the camera to the device body.

9. The method claimed in claim 7, wherein the step of indicating to the camera to capture an image while the camera is not attached to the device body comprises the camera receiving user input via a device user interface on the device body and transmitting an indication via the WPAN to the camera to capture an image.

10. The method claimed in claim 7, wherein the step of indicating to the camera to capture an image while the camera is not attached to the device body comprises the camera receiving user input via a camera user interface on the camera.

11. The method claimed in claim 7, wherein the step of transmitting digital signals representing an image from the camera to the device body comprises:
sensing if the camera is attached to the device body;
if it is sensed that the camera is attached to the device body, then transmitting digital signals representing images from the camera to the device body via mating electrical contacts on the body and the camera; and
if it is sensed that the camera is not attached to the device body, then transmitting digital signals representing images from the camera to the device body via WPAN.

12. A wireless mobile telecommunications device, comprising:
a device body;
a device user interface;
a device electrical connector;
a wireless network transceiver for wirelessly communicating with a wireless telecommunications network;
a first WPAN transceiver in the device body for wirelessly communicating digital signals locally; and
a detachable camera adapted to be selectively attached to and detached from the device body, the detachable camera including a second wireless personal area network (WPAN) transceiver for communicating with the device body when detached therefrom, a battery, and a camera electrical connector for communicating with the device body when the detachable camera is attached thereto,
wherein settings and configurations for the detachable camera may be entered on the device body and transmitted from the device body to the detachable camera through the first WPAN transceiver and the second WPAN transceiver,
wherein the battery is charged from the device electrical connector through the camera electrical connector.

13. The wireless mobile telecommunications device claimed in claim 12, wherein the WPAN substantially conforms to the BLUETOOTH specification.

14. The wireless mobile telecommunications device claimed in claim 12, wherein the camera includes a camera user interface for receiving from a user an indication to capture an image.

15. The wireless mobile telecommunications device claimed in claim 12, wherein at least one of the device body and the camera includes a release mechanism operable by a user for detachably securing the camera to the device body.

16. The wireless mobile telecommunications device claimed in claim 15, further comprising:
processing logic programmed or configured to sense whether the camera is attached to the device body; and
if the processing logic senses that the camera is attached to the device body, then enabling communication of digital signals representing images with the camera via the electrical contacts;
if the processing logic senses that the camera is not attached to the device body, then enabling communication of digital signals representing images with the camera via WPAN.

* * * * *